US010142683B2

(12) United States Patent
Dogui

(10) Patent No.: US 10,142,683 B2
(45) Date of Patent: Nov. 27, 2018

(54) METHOD OF ACCESS TO MULTIMEDIA CONTENT PROTECTED BY A TERMINAL

(71) Applicant: Viaccess, Paris la Defense (FR)

(72) Inventor: Amine Dogui, Issy-les-Moulineaux (FR)

(73) Assignee: VIACCESS, Paris la Defense (FR)

( * ) Notice: Subject to any disclaimer, the term of this patent is extended or adjusted under 35 U.S.C. 154(b) by 47 days.

(21) Appl. No.: 15/326,904

(22) PCT Filed: Jul. 10, 2015

(86) PCT No.: PCT/FR2015/051928
§ 371 (c)(1),
(2) Date: Jan. 17, 2017

(87) PCT Pub. No.: WO2016/009140
PCT Pub. Date: Jan. 21, 2016

(65) Prior Publication Data
US 2017/0208361 A1    Jul. 20, 2017

(30) Foreign Application Priority Data

Jul. 16, 2014   (FR) ...................................... 14 56806

(51) Int. Cl.
*H04N 21/4405*   (2011.01)
*H04L 29/06*   (2006.01)
(Continued)

(52) U.S. Cl.
CPC ....... *H04N 21/44055* (2013.01); *G06F 21/10* (2013.01); *H04L 63/145* (2013.01); *H04N 5/913* (2013.01); *H04N 21/4334* (2013.01); *H04N 21/4408* (2013.01); *H04N 2005/91364* (2013.01)

(58) Field of Classification Search
CPC ................................................ H04N 21/44055
See application file for complete search history.

(56) References Cited

U.S. PATENT DOCUMENTS

| 5,910,987 A * | 6/1999 | Ginter ..................... G06F 21/10 |
| | | 348/E5.006 |
| 6,747,580 B1 | 6/2004 | Schmidt |

(Continued)

FOREIGN PATENT DOCUMENTS

| EP | 1343318 | 10/2003 |
| EP | 1947854 | 7/2007 |

(Continued)

*Primary Examiner* — Simon P Kanaan
(74) *Attorney, Agent, or Firm* — Occhiuti & Rohlicek LLP

(57) ABSTRACT

A method for accessing protected multimedia includes receiving an encrypted fragment of the multimedia content and receiving a key for decrypting it, using the key to decrypt the fragment, thereby obtaining an unscrambled fragment, replacing original bits of the unscrambled fragment with different substituted bits to obtain a modified fragment, and reconstructing the modified fragment is reconstructed by replacing substituted bits of the extracted modified fragment with the original bits. The resulting reconstructed fragment is then decoded and the resulting decoded fragment is sent to a multimedia appliance to be enjoyed by a human viewer.

7 Claims, 2 Drawing Sheets

(51) Int. Cl.
    *H04N 5/913*     (2006.01)
    *H04N 21/4408*     (2011.01)
    *H04N 21/433*     (2011.01)
    *G06F 21/10*     (2013.01)

(56) References Cited

U.S. PATENT DOCUMENTS

| | | | |
|---|---|---|---|
| 2008/0208560 A1* | 8/2008 | Johnson | G06F 21/14 703/22 |
| 2009/0003600 A1 | 1/2009 | Chen et al. | |
| 2009/0279691 A1 | 11/2009 | Farrugia et al. | |
| 2010/0020968 A1 | 1/2010 | Jin et al. | |

FOREIGN PATENT DOCUMENTS

| | | |
|---|---|---|
| EP | 2268020 | 12/2010 |
| FR | 2951891 | 10/2009 |
| WO | 03/058485 | 7/2003 |
| WO | 2011/026134 | 3/2011 |

* cited by examiner

METHOD OF ACCESS TO MULTIMEDIA CONTENT PROTECTED BY A TERMINAL

RELATED APPLICATIONS

This is the national stage under 35 USC 371 of international application PCT/FR2015/051928, filed on Jul. 10, 2015, which claims the benefit of the priority date of French application 1456806, filed on Jul. 16, 2014, the contents of which are herein incorporated by reference.

FIELD OF INVENTION

The invention relates to a method for accessing protected multimedia content by a terminal comprising a descrambler, a decoder and a shared memory, and also to a terminal and an information storage medium for executing such a method.

BACKGROUND

A user often uses a terminal user to access protected content in order to play it. Accessing protected multimedia content generally includes loading it into memory, lifting the protection thereof, either on the fly when it is received or on a storage medium on which it has previously been stored, decoding it, and finally, transmitting it to a multimedia appliance capable of playing it, storing it, or making any other use thereof offered by the service supplying protected multimedia contents.

Here, "lifting the protection on the fly" describes the fact that fragments of the multimedia content are processed as and when they are received without waiting for all fragments of the multimedia content to be completely and entirely received.

A typical terminal comprises a descrambler, a decoder, and a memory shared by the descrambler and the decoder. Typical content that can be supplied includes audiovisual content, for example television programs, audio only content, for example a radio program, or, more generally, any digital content containing video and/or audio, such as a computer application, a game, a slideshow, a picture or any set of data.

Among this content is temporal content. Temporal multimedia content is multimedia content played by a succession in time of sounds, in the case of an audio temporal content, or of pictures, in the case of a video temporal content, or of sounds and pictures temporally synchronized with one another in the case of an audiovisual temporal multimedia content. Temporal multimedia content can also comprise interactive temporal components temporally synchronized with the sounds or the pictures.

To be supplied, such content is first of all coded, or compressed. This allows transmission to require less bandwidth.

The video component of the content is coded according to a video format, such as MPEG-2. A complete presentation of this format can be found in a document published by the International Organization for Standardization under the reference ISO/IEC 13818-2:2013 and the title "Information Technology—Generic coding of moving pictures and associated audio information—Part 2: Video data". Many other formats, such as MPEG-4 ASP, MPEG-4 Part 2, MPEG-4 AVC (or Part 10), HEVC (High Efficiency Video Coding), or WMV (Windows Media Video) can alternatively be used, and rely on the same principles. Thus, all of the following applies equally to these other video formats which rely on the same principle as the MPEG-2 coding.

MPEG-2 coding involves general data compression procedures.

For fixed pictures, MPEG-2 exploits the spatial redundancy internal to a picture, the correlation between the neighboring points and the lesser sensitivity of the eye to details.

For moving pictures, MPEG-2 exploits the strong temporal redundancy between successive pictures. The exploitation thereof makes it possible to code certain pictures of the content, here said to be "deduced pictures," by reference to others, here said to be "sourced pictures." The process of decoding the deduced pictures can be carried out by prediction or interpolation. This means that decoding the deduced pictures is possible only after decoding the source pictures.

Other features, referred to herein as "initial pictures," are coded without reference to such source pictures. These pictures contain, when they are coded, all of the information necessary to their decoding. Therefore, they can be completely decoded independently of the other pictures. These initial pictures are thus the obligatory point of entry when accessing the content. The resulting coded content does not therefore comprise the data necessary to the decoding of each of the pictures independently of the others, but it is made up of "sequences" according to the MPEG-2 terminology. One sequence implements the compression of at least one "group of pictures" (or GOP in MPEG-2).

A group of pictures is a series of consecutive pictures in which each picture is either an initial or source picture for at least one deduced picture contained in the same series of consecutive pictures, or a deduced picture such that each of the source pictures necessary to its decoding belongs to the same series of consecutive pictures.

A group of pictures does not contain any smaller series of consecutive pictures having the same properties as above. The group of pictures is thus the smallest part of content that can be accessed without having to previously decode another part of this content.

A sequence is delimited by a "header" and an "end," each identified by a first specific code. The header comprises parameters that characterize properties expected of the decoded pictures, such as the horizontal and vertical sizes, ratio, frequency. The standard recommends repeating the header between the groups of pictures of the sequence in such a way that the successive occurrences thereof are spaced apart by approximately a few seconds in the coded content.

For example, a group of pictures more commonly than not, comprises more than 5 to 10 pictures and, generally, less than 12 or 20 or 50 pictures. For example, in a system that displays 25 pictures per second, a group of pictures typically represents a playing time greater than 0.1 or 0.4 seconds and, generally, less than 0.5 or 1 or 10 seconds.

Temporal multimedia content can comprise several video components. In this case, each of these components is coded as described above.

The audio component of the content is moreover coded according to an audio format such as MPEG-2 audio. A complete presentation of this format in a document published by the International Organization for Standardization under the reference ISO/IEC 13818-3:1998 and the title "Information Technology—Generic coding of moving pictures and associated audio information—Part 3: Audio". Many other formats, such as MPEG-1 Layer III, better known by the name MP3, AAC (Advanced Audio Coding), Vorbis or WMA (Windows Media Audio), can alternatively be used, and rely on the same principles. Thus, all of the following applies equally to these other audio formats which rely on the same principles as the MPEG-2 audio coding.

MPEG-2 audio coding obeys the same principles described above for that of temporal video content. The resulting coded content therefore, likewise, consists of "frames." A frame is the analog, in audio, of a group of pictures in video. The frame is therefore the smallest part of audio content that can be accessed without having to decode another part of this audio content. The frame further contains all the information useful to the decoding thereof.

A frame typically comprises more than 100 or 200 samples each coding a sound and, generally, less than 2000 or 5000 samples. Typically, when it is played by a multimedia appliance, a frame lasts more than 10 ms or 20 ms and, generally, less than 80 ms or 100 ms. In some examples, a frame comprises 384 or 1152 samples, each coding a sound. Depending on the signal sampling frequency this frame represents a playing time of 8 to 12, or 24 to 36 milliseconds.

Temporal multimedia content can comprise several audio components. In this case, each of these components is coded as described above.

The coded components of content, also qualified as elementary data streams, are then multiplexed, that is to say, notably, temporally synchronized, then combined into a single stream, or flow, of data.

Such content, notably when the subject of rights such as copyrights or similar rights, is supplied in protected form by a multimedia content protection system. This system makes it possible to ensure the observance of conditions for access to the content that devolve from these rights.

The content is typically supplied in encrypted form, for its protection, by a digital rights management ("DRM") system. This encryption is generally performed by an encryption key and a symmetrical algorithm. It is applied to the stream resulting from the multiplexing or, before multiplexing, to the components of the coded content.

A DRM system is in fact a multimedia content protection system. The terminology of the field of digital rights management systems is thus used hereinafter in this document. A more comprehensive description thereof is found in the document: DRM Architecture, Draft version 2.0, OMA-DRM-ARCH-V2_0-20040518-D, Open Mobile Alliance, 18 May 2004.

In such a digital rights management system, obtaining a license enables a terminal to access a protected multimedia content. Such a license comprises a content key. This content key is necessary to decrypt the multimedia content that has been protected by the symmetrical encryption algorithm.

The content key is generally inserted into the license in the form of a cryptogram obtained by the encryption of the content key with an encryption key, which is called a "terminal" key, that is specific to the terminal or known thereto.

To access the content, the terminal extracts the content key from the license by decrypting its cryptogram using its terminal key.

Next, the terminal's descrambler descrambles, or decrypts, the content by means of the content key duly extracted from the license, thus lifting the protection. The descrambler thus generates unscrambled multimedia content comprising at least one temporal series of video sequences or of groups of pictures, or of audio frames. This multimedia content can be played by a multimedia appliance connected to the terminal.

As used herein, "unscrambled" describes the fact that the multimedia content no longer needs to be decrypted to be played, by a multimedia appliance in a way that is directly perceptible and intelligible to a human being. The term "multimedia appliance" also denotes any device capable of playing the unscrambled multimedia content, for example, a television or a multimedia player.

Next, the descrambler next transfers the unscrambled content into the shared memory.

Next, the decoder of the terminal reads the unscrambled content in the shared memory, and decodes it.

Finally, the terminal transmits the duly decoded content to a multimedia appliance.

More specifically, in the case of temporal multimedia content, the reception, the processing, then the transmission to a multimedia appliance, by the terminal, of the content, as described above, are done in fragments.

A fragment is a restricted part of the unscrambled multimedia stream that has a shorter playing time than that of the entire multimedia stream. A fragment therefore comprises a restricted part of each video and audio component of the unscrambled multimedia stream that has a shorter playing time than that of the entire multimedia stream. These restricted parts of components are synchronized in the stream to be played simultaneously. A fragment therefore comprises the restricted part of the temporal series of video sequences or of groups of pictures or of audio frames implementing the coding of this restricted part of component of the unscrambled multimedia stream. This restricted part consists, typically, of a plurality of video sequences or of groups of pictures, or of successive audio frames.

In the method for accessing the content by the terminal as described above, the descrambled content is transferred into the shared memory of the terminal by its descrambler to then be read therein by its decoder. The unscrambled content is therefore present in this memory, at least between the instant when it is deposited therein by the descrambler and when it is read by the decoder. It is then easy, in such an open environment, to read the descrambled content therein and to thus obtain illegal access to the content. Additional protection of the content during its presence in the shared memory is therefore necessary.

Known cryptographic solutions to this problem rely on the sharing of keys by the descrambler and the decoder. In these solutions, the descrambler encrypts the descrambled content, before transferring it into the shared memory. Then, the decoder reads the duly encrypted content in the shared memory, decrypts it and, before it is possibly stored in a memory of the terminal, decodes it and transmits it to a multimedia appliance capable of playing it. These cryptographic solutions are safe but have the drawback of being complex and of requiring significant computing resources to successfully conduct the cryptographic computations involved.

Other solutions are known which share this drawback, consisting for example in the translation of the content into other content formats.

Solutions consisting in implementing security mechanisms such as the verification, by the DRM module of the terminal, of the destination application of the unscrambled content, are also known. These solutions present the drawback whereby this implementation is unsafe in open environments such as terminals.

SUMMARY

The method concerned can be implemented after obtaining protected multimedia content from any service supplying protected multimedia content online, in any system supplying protected multimedia content online in which a head end ensures the protection of the contents and the transmission thereof to a plurality of terminals.

In one aspect, the invention replacement of a string of M original bits with a string of N substituted bits, where N is strictly greater than M, makes it possible to increase the security of the method by making cryptanalysis attempts more difficult. In effect, not knowing N, the observer of the shared memory of the terminal does not have a priori knowledge of how to delimit a modified fragment. Furthermore, even if the observer managed to delimit the modified fragments, that would not provide any information about the value of M This makes it very difficult to reconstruct the unscrambled fragments from modified fragments. In contrast to the conventional case, in which the encrypted data is the same size as the unscrambled data in a cryptographic method, this is no longer true in the present case.

Furthermore, since N is greater than M, the number of possible values of the strings of N substituted bits is very much greater than that of the possible values of M original bits. That makes any cryptanalysis attempt more difficult. Furthermore, it makes it possible to vary this replacement of strings of M original bits with strings of N substituted bits, by using, for example, several different strings of N substituted bits already or not previously used to replace a same string of M original bits.

The various embodiments recited in the claims offer the following advantages:

The use of a first look-up table makes it possible to implement a selection of the string of N substituted bits in the first table rather than the calculation thereof as a function of the value of the string of M original bits. That offers an additional advantage in terms of security, by making the cryptanalysis of the method more difficult, and more specifically by guaranteeing that the external observation, for example of the computation time or of the electrical consumption, of the system during the implementation of the method, with regard to the values of these of original and substituted bits, does not give any information on the nature of the substitution of bits performed to obtain the modified fragment. Furthermore, the implementation of an input-output operation in the first look-up table rather than a computation operation also presents the advantage of significantly reducing the computation time.

The use of a second look-up table makes it possible to implement a selection preceded by the search for the string of N substituted bits in the second table rather than a search in the first table for the string of M original bits with which the string of N substituted bits of the modified fragment is associated. This reduces the complexity of the search that has to be performed, and therefore reduces the computation time.

The ranking of the lines of the second look-up table by order of values of M bits of given indices makes it possible to use these M bits as an index of the second look-up table in order to directly select, in the second look-up table, the string of M original bits associated with the string of N substituted bits of the modified fragment. This implementation of an input-output operation in the second look-up table rather than a search operation presents, as above, the advantage of significantly reducing the computation time.

The use of several different first look-up tables makes it possible to increase the security of the method by making the cryptanalysis thereof more difficult. More specifically, it makes it possible to vary the replacements of bits performed to produce a modified fragment and to reconstruct the unscrambled fragment.

The use of first look-up tables differing from one another by the value of M or by the value of N makes it possible to increase the security of the method by making the cryptanalysis thereof more difficult. More specifically, it makes it possible to vary the lengths of the strings of original bits or of the strings of substituted bits.

The random or pseudo-random drawing of a number makes it possible to increase the security of the method by making the cryptanalysis therefore more difficult. More specifically, it makes it possible to randomly vary the succession of the replacements of bits performed to produce a modified fragment and to reconstruct the unscrambled fragment.

Making the number of different first look-up tables or of bytes of the number randomly or pseudo-randomly drawn equal to a strictly positive power of two makes it possible to reduce the computation time. More specifically, it simplifies replacement of original bits of the unscrambled fragment with different substituted bits to obtain a modified fragment and replacement the substituted bits of the extracted modified fragment with the original bits to reconstruct the unscrambled fragment, which involve divisions modulo these numbers. In effect, these divisions amount to shifts of bits if these numbers are powers of two.

In another aspect, the invention features a non-transitory and tangible information storage medium comprising instructions for implementing the above method for accessing a protected multimedia content when these instructions are executed by an electronic computer.

Another aspect of the invention is a terminal comprising a descrambler, a decoder, and a shared memory for implementing the above method for accessing a protected multimedia content.

The invention will be better understood on reading the description below, given purely as a non-limiting example, and with reference to the drawings in which:

BRIEF DESCRIPTION OF THE DRAWINGS

In these figures, the same references are given to denote the same elements. Hereinafter in this description, the features well known to those skilled in the art are not described in detail.

DETAILED DESCRIPTION

Figures 1, 2:
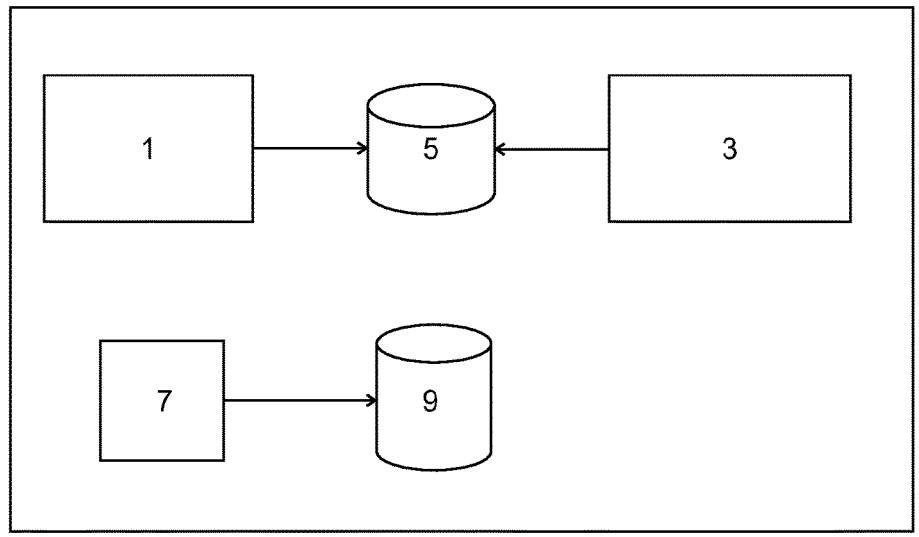
FIG. 1 is a schematic representation of a terminal comprising a descrambler, a decoder and a shared memory.
FIG. 2 is a partial schematic representation of first and second corresponding look-up tables.

FIG. 1 represents a terminal capable of accessing protected multimedia content. The terminal comprises a descrambler 1, a decoder 3, a shared memory 5, which is shared by the descrambler and the decoder, a programmable electronic computer 7, and an instruction memory 9.

The descrambler 1 is capable of storing information in the shared memory 5 and, like the decoder 3, of extracting information therefrom.

The electronic computer 7 is capable of executing instructions stored in the instruction memory 9. The instruction memory 9 comprises instructions necessary for the execution of the method described in connection with FIG. 3.

The shared memory 5 and the instruction memory 9 can be independent, as in FIG. 1, or merged. Alternatively, the shared memory 5 can be a part of the instruction memory 9.

FIG. 2 represents a part of a first look-up table 12 and a part of a second look-up table 18. In FIG. 2, each byte is in hexadecimal form. The "|" symbol represents concatenation of bytes.

The first look-up table 12 comprises a line for each possible byte value. It therefore comprises a first column containing all fourteen possible strings of eight original bits. In this example, the number of bits of the string 14, hereinafter denoted M, is equal to eight. There are therefore 2M strings 14 with values lying between 0x01 and 0xFF. Each line of the first look-up table 12 associates, with its string 14, a concatenation of first and second byte, that is to say a string 16 of sixteen substituted bits. In this embodiment, the number of bits of the string 16, hereinafter denoted N, is sixteen. There are therefore 2N possible strings 16, of which the first look-up table 12 contains only 2M Each string 16 is different from the other strings 16. The strings 16 are contained in a second column of the first look-up table 12.

The lines of the first look-up table 12 are ranked by order of values of the strings 14 to constitute an index of that table. This index makes it possible to speed up the search for and the selection of a line of the first look-up table 12 that contains a given string 14.

Furthermore, the value of this index varies by a regular step from one value to the next. This makes it possible to directly identify the line of the first look-up table 12 containing this index without having to read the content of other lines.

In this example, the value of the index is equal to the number of the line of the first look-up table 12 containing this string 14. As a result, it is possible to search more rapidly for a given string 14.

To simplify the illustration, FIG. 2 represents only the eight lines relating to the strings 14 of values, respectively, 0xA0 to 0xA7. For example, the first line represented in the first look-up table 12 associates the string 16 of sixteen substituted bits 0xD4|0x03 with the string 14 of eight original bits 0xA0. The string 0xA0 is located on the line 0xA0, that is to say the 160th line, of the first look-up table 12, starting from the first line of this table.

Furthermore, in the first look-up table 12, the set of values of the second bytes out of the concatenated bytes, that is to say the eight bits of indices 9 to 16 of each string 16, is equal to the set of the strings 14. In FIG. 2, the visible second bytes of the strings 16 lie between 0x01 and 0x08.

The second look-up table 18 of FIG. 2 comprises a line for each string 16 of sixteen substituted bits. Each line associates, with this string 16, the string 14 with which this string 16 is associated by the first look-up table 12. The first and second look-up tables 12, 18 are thus said to "correspond." The strings 16, 14 are contained, respectively, in the first and second columns of the second look-up table 18. The first line represented in the second look-up table 18, for example, associates the string 14 of eight original bits 0xA4 with the string 16 of sixteen substituted bits 0x5B|0x01.

Furthermore, the lines of the second look-up table 18 are ranked by order of values of the second bytes, that is to say the eight bits of indices 9 to 16 of each string 16. The values of these second bytes cover all the possible values lying between 0x01 and 0xFF. They thus constitute an index of this second table. As was the case previously, this index makes it possible to speed up the search for and the selection of the line of the second look-up table 18 containing a given string 16. In effect, since the value of this index varies by a regular step from one value to the next, it becomes possible to directly identify the line of the second look-up table 18 containing this index without having to read the content of other lines. In this case, the value of the index is equal to the number of the line of the second look-up table 18 containing this string 16. This saves time over the case in which the values of the index are not uniformly distributed between their limit values. In FIG. 2, the second bytes shown take values lying between 0x01 and 0x08 and occupy, respectively and in ascending order, the lines one to eight of the second look-up table 18.

Figure 3:
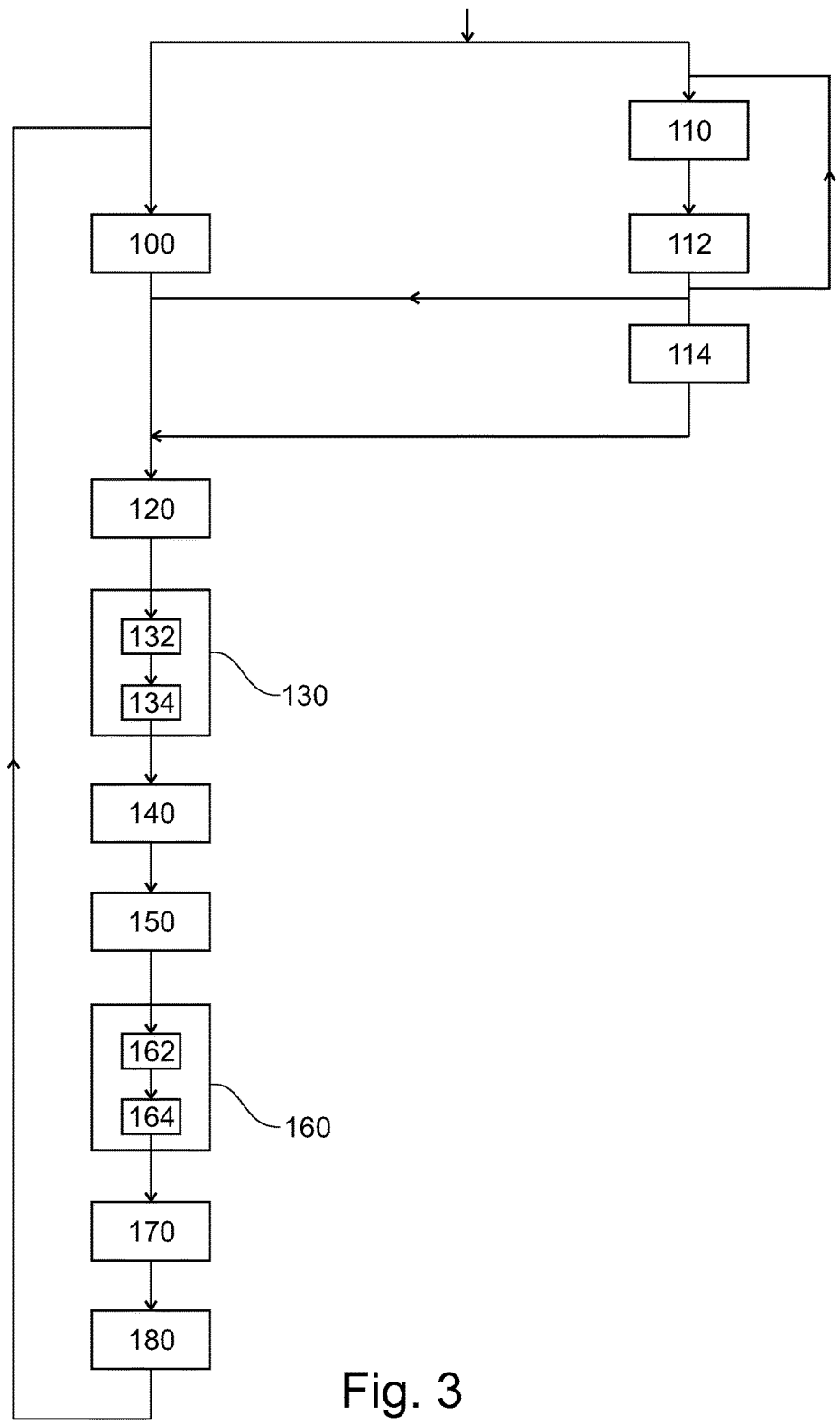
FIG. 3 is a schematic representation of a method for accessing protected multimedia content using the terminal of FIG. 1.

The operation of the terminal of FIG. 1 will now be described with reference to the method of FIG. 3.

The method begins with an initialization phase. This initialization phase comprises a first initialization-step 110 and a second initialization-step 112 during which the first and second look-up tables 12, 18 are constructed and stored. The initialization phase also includes a third initialization-step 114 of constructing an initialization number S.

Although many things can trigger the initialization phase, in the embodiment described herein, starting up the terminal triggers the initialization phase. In this case, it is preferable that the tables be constructed and the initialization number S be stored in a volatile memory, like a RAM (Random Access Memory). This will ensure automatic erasure thereof when the terminal is switched off.

More specifically, in the first initialization-step 110, the terminal constructs and stores the first look-up table 12 in a memory that is accessible to the descrambler 1. This memory can be a memory specific thereto, a part of the instruction memory 9, or the shared memory 5. In one example, the first look-up table 12 is constructed by performing the following operations for each possible string 14:
a) The terminal randomly draws a string 16 from all the 2N possible strings 16, and
b) If the randomly-drawn string 16 has not already been associated with another string 14, it is associated, in the first look-up table 12, with this string 14. Otherwise, the operations a) and b) are repeated.

Next, in a second initialization-step 112, the terminal constructs and stores the corresponding second look-up table 18 in a memory accessible to the decoder 3. This memory can be a memory specific thereto, a part of the instruction memory 9, or the shared memory 5.

In one example, in this second initialization-step 112, the second look-up table 18 is constructed from the first look-up table 12 previously stored in the first initialization-step 110. One way to carry this out is to swap the contents of the first and second columns of the first look-up table 12 and to then rank the lines of this new table in ascending or descending order of the values of the second bytes of the first column. In this embodiment, the lines are ranked by ascending order of the values of the second bytes.

The first initialization-step 110 is executed a predetermined number $t_1$ of times. This stores $t_1$ different first look-up tables 12. Preferably, the number $t_1$ is equal to a strictly positive power of two. Similarly, the second initialization-step 112 is executed $t_2$ times so as to store $t_2$ different second look-up tables 18. The numbers $t_1$ and $t_2$ are non-negative integers, with $t_1$ being greater than or equal to $t_2$. In this embodiment, $t_1$ and $t_2$ are equal.

In the illustrated embodiment, on execution of the first initialization-step 110, the numbers M and N are modified by always observing the fact that the number N is strictly greater than the number M. For example, on each iteration of the first initialization-step 110, the number M is drawn randomly or pseudo-randomly from a predetermined range of possible values. Then, the same procedure is applied to the number N. Typically, the number M varies between 4 and 16 bits and the number N varies between 8 and 24 bits. Thus, the first look-up tables 12 that are obtained differ from one another also by the values of the numbers M and N.

Each of the stored first look-up tables 12 is identified by an index i between 0 and $t_1-1$. Similarly, each of the stored second look-up tables 18 is identified by an index. The index of each of the second look-up tables 18 is chosen such that the corresponding first and second look-up tables 12, 18 bear the same index i. To promote conciseness of exposition, T[i] and L[i] are used herein to denote corresponding first and second look-up tables 12, 18 of index i.

In the third initialization-step 114, the terminal draws, randomly or pseudo-randomly, a strictly positive integer of k bytes. This integer constitutes the initialization number S. Preferably, the initialization number S is drawn randomly or pseudo-randomly from a set containing only strictly positive powers of two. The number k is either a predetermined number or itself drawn randomly or pseudo-randomly from a predetermined set of values. Similarly, in this embodiment, the terminal also randomly or pseudo-randomly draws a strictly positive integer u. This number u represents a number of consecutive uses of the same first look-up table 12. The initialization number S and the number u thus constructed are then made available to the descrambler 1 and to the decoder 3. To do so, the terminal stores the initialization number S and the number u and the length k in bytes of the initialization number S in the shared memory 5. In the particular embodiment described herein, the number $t_1$ is also stored in the shared memory 5.

Before, in parallel with, or after the initialization phase, in a receiving step 100, the descrambler 1 receives an encrypted fragment of multimedia content and a key for decrypting this encrypted fragment. As is known to those skilled in the art, the encrypted fragment and the decryption key can be received jointly, that is to say at one and the same moment and via one and the same communication network or one and the same storage medium, internal or external to the terminal. The encrypted fragment and the decryption key can also be received separately, that is to say at distinct moments or via distinct communication networks or storage media, internal or external to the terminal. Here, as has been described above, the terminal receives the key for decrypting the encrypted fragment in a DRM license.

After the receiving step 100 and the initialization phase, in a decryption step 120, the descrambler 1 decrypts the fragment with the decryption key, both of which were received in the receiving step 100. It thus obtains an unscrambled fragment.

After the decryption step 120, and before the decrypted fragment is stored in the shared memory 5, the descrambler executes a replacement step 130 in which it replaces the original bits of the unscrambled fragment with different substituted bits to obtain a modified fragment.

More specifically, the descrambler 1 replaces, by blocks constructed step-by-step, all the original bits of the unscrambled fragment with substituted bits. Each of these blocks of bits will hereinafter be denoted $P_x$. The index "x" designates the serial number or the rank of the block $P_x$. In the illustrated embodiment, the serial number of the first block of bits of the unscrambled fragment is "1" and that of the last block of bits is an integer "X" that is a priori unknown and determined at the end of the replacement step 130. The index "x" therefore lies between 1 and X. The concatenation of all the blocks $P_x$ in the order of the indices x is equal to the unscrambled fragment.

To execute the replacement step 130, the descrambler 1 implements, for each of these blocks $P_x$, a table-selection operation 132 and a bit-replacement operation 134.

In the table-selection operation 132, the descrambler 1 selects one of the first look-up tables 12 stored in the first initialization-step 110 in order to use it to replace the original bits of this block $P_x$ with substituted bits. To carry this out, the descrambler 1 extracts, from the shared memory 5, the initialization number S and its length k in bytes, the number u, and the number $t_1$ of first look-up tables 12 stored in the first initialization-step 110. Next, the index i of the selected table T[i] is determined using the following formula:

$$i = S[((x-1)\text{div } u)\text{modulo } k]\text{modulo } t_1,$$

in which S[j] is a function that returns the byte of index j in the initialization number S, and "div" designates the Euclidian division operation. Once the table T[i] has been selected, the number M of bits of the strings 14 contained in the first column of this table T[i] will be known.

Next, in the bit-replacement operation 134, the descrambler 1 replaces the original bits of the block $P_x$ with substituted bits using the table T[i] selected in the preceding execution of the table-selection operation 132. More specifically, if there remain at least M original bits of the unscrambled fragment to be replaced, the descrambler 1 constructs the block $P_x$ using the M first bits of the unscrambled fragment remaining to be replaced. This block $P_x$ therefore constitutes a string of M consecutive original bits of the unscrambled fragment. The replacement then consists of searching for and reading, in the selected first look-up table 12, the string 16 associated with the string 14 having the same value as the block $P_x$, and concatenating, in the order of reading, this string 16 read with the preceding strings 16 that have already been read.

In the particular embodiment described herein, the search is particularly simple and rapid because the number of the line of the table T[i] that contains the string 16 that is to be read can be constructed directly from the value of the block $P_x$ and without having to consult the content of other lines of this table. For example, the string 16 is read on the line of number $P_x$ of the table I[i].

By reiterating the table-selection and bit-replacement operations 132, 134, it is possible to carry out a step-by-step construction of a modified fragment in which each block $P_x$ has been replaced by a respective string 16.

If there remain fewer than M original bits of the unscrambled fragment to be replaced, the original bits of the unscrambled fragment remaining to be replaced are arbitrarily complemented by additional bits to form a block of M consecutive bits to be processed as the preceding ones.

For example, if the table T[i] of index i is that of FIG. 2, and if the block $P_x$ of the unscrambled fragment is equal to the string 14 of eight original bits 0xA4, then the block of index x of the modified fragment is the string 16 of sixteen substituted bits 0x5B|0x01.

Next, once the table-selection and bit-replacement operations 132, 134 have been implemented for all the blocks $P_x$, there is a fragment-storage step 140 in which the descrambler 1 stores only the duly obtained modified fragment in the shared memory 5. This is followed by a fragment-extraction step 150, in which the decoder 3 extracts the modified fragment from the shared memory 5.

Next, in a fragment-reconstruction step 160, the decoder 3 replaces the substituted bits of the modified fragment with the original bits to reconstruct the unscrambled fragment from the modified fragment.

To carry out this reconstruction, the decoder 3 replaces, with blocks constructed step-by-step, all of the substituted bits of the modified fragment with the original bits. Each of these blocks of bits will hereinafter be denoted $P_x^*$. The index "x" designates the serial number or the rank of the block $P_x^*$. In the embodiment described herein, the serial number of the first block of bits of the modified fragment is "1" and that of the last block of bits is an integer "X" that is a priori unknown and only determined at the end of the fragment-reconstruction step 160. The index "x" therefore lies between 1 and X. The concatenation of the blocks $P_x^*$ in the order of the indices x is equal to the modified fragment. To carry this out, the decoder 3 implements, for each of these blocks $P_x^*$, a table-pairing operation 162 followed by a bit-restoration operation 164.

The decoder 3 begins the table-pairing operation 162 by determining the index i of the table T[i] selected and used in the replacement step 130. Then, it selects the table L[i] that forms, with the table T[i], a pair of corresponding tables.

To achieve this, the decoder 3 extracts, from the shared memory 5, the initialization number S and its length k in bytes, the number u, and the number $t_1$ of first look-up tables 12 stored in the first initialization-step 110. Next, the index i of the table L[i] is determined using the following formula:

$$i = S[((x-1) \text{div } u) \text{modulo } k] \text{modulo } t_1,$$

in which x is the serial number of the block $P_x^*$ which will be processed in the next bit-restoration operation 164. The decoder 3 then selects the table L[i] of index i. From this moment, the number N of bits of the strings 16 of the table L[i] will be known.

Next, in the bit-restoration operation 164, the decoder 3 performs the replacement of the substituted bits of the block $P_x^*$ with the original bits by means of the table L[i] selected in the preceding execution of the table-pairing operation 162. To achieve this, the decoder 3 constructs the block $P_x^*$ with the N first bits of the modified fragment remaining to be replaced. The block $P_x^*$ is thus a string of N consecutive substituted bits. The replacement then comprises: reading, in the selected table L[i], the string 14 associated with the string 16 of which the value is equal to that of the block $P_x^*$, and concatenating, in the order of reading, this string 14 read with the preceding strings 14 that have been read.

The reading of the string 14 in the table L[i] is particularly rapid because the second byte of the string 16 makes it possible to directly construct the number of the line of the table L[i] containing the string 14 to be read without consulting the content of other lines of this table. For example, the string 14 is read on the line of the table L[i] whose line number is equal to the value of the second byte of the string 16.

By repeating the table-pairing operation 162 and the bit-restoration operation 164, the decoder reconstructs the unscrambled fragment step-by-step.

In the bit-restoration operation 164, if the decoder 3 detects that it has reached the last block $P_x^*$ of the modified fragment to be processed, it replaces the last block $P_x^*$ like the preceding ones. Next, it concatenates, with the preceding strings 14 read, only the first useful bits of the string 14. To determine the number of useful bits of this string 14, the decoder 3 uses, for example, length information contained in the part of the unscrambled fragment already obtained. The position of this length information in the unscrambled fragment is set by the known coding format used for the unscrambled fragments. This length information can also be predetermined information relating to the structure of each fragment and imposed by the coding format used.

For example, if the table L[i] is that of FIG. 2, and if the block $P_x^*$ is the string of sixteen substituted bits 0x5B|0x01, then the block $P_x$ reconstructed from the unscrambled fragment is the string 14 of eight original bits 0xA4.

Next, when the table-pairing operation 162 and bit-restoration operation 164 have been implemented for all the blocks $P_x^*$, and before the unscrambled fragment is possibly stored in a memory of the terminal, there is a decoding step 170. In this decoding step 170, the decoder 3 decodes the unscrambled fragment obtained. In the embodiment described herein, the unscrambled fragment obtained by the decoder 3 is never stored in a shared memory and, in particular, it is never stored in the shared memory 5.

Finally, in a transmission step 180, the decoder 3 transmits the decoded fragment to a multimedia appliance capable of playing this decoded fragment of multimedia content so that it is directly perceptible and comprehensible to a human being.

Many other embodiments of the invention are possible. For example, in some embodiments, the multimedia content is supplied in a protected form by a conditional access system, CAS. The terminology of the field of conditional access systems is then used. A more comprehensive description thereof can be found in the document: "Functional Model of a Conditional Access System", EBU Review, Technical European Broadcasting Union, Brussels, BE, No. 266, 21 Dec. 1995, the contents of which are herein incorporated by reference. In this case, the content key is generally designated as a control word, and in an access entitlement control message, ECM.

In another embodiment, the multimedia content is supplied in protected form by any other type of content protection system, such as a more conventional data protection system that does not perform any access rights management. In this case, the content key can be received in any other type of transmission message.

As alluded to above, the initialization phase can be triggered by other events. For example, the execution of the first and second initialization-steps 110, 112 can be triggered in response to the execution of a module for accessing protected content of the terminal. It can also be triggered periodically or after a predetermined number of uses of the first and second look-up tables 12, 18 or of the initialization number S previously constructed.

In an alternative embodiment, in the first and second initialization-steps 110, 112, the first and second look-up tables 12, 18 can be precomputed. These will then be static and can thus be incorporated into the instructions stored in the instruction memory 9 as part of the development of these instructions.

In yet another embodiment, the numbers M and N are constant on each execution of the first initialization-step 110. In one example, the number M is chosen to be equal to eight and the number N is chosen to be equal to an integer multiple of eight greater than or equal to sixteen.

In yet another embodiment, only the number N varies from one execution to another of the first initialization-step 110 whereas the number M remains constant.

The M bits of each string 16 of the tables L[i] used to form the index of this table are not necessarily the last M bits of each string 16. In fact, these M bits can be at any position in the string 16 from the moment when the placement of these M bits is known by the decoder 3. For example, these M bits can be made to occupy only the positions of even indices in the string 16.

In another embodiment, the first column of the table L[i] is simply ranked by ascending or descending order of the values of the strings 16 and no index such as that previously described for the second look-up table 18 is used.

Another embodiment omits the second initialization-step 112 after implementation of the first initialization-step 110. Only the first look-up tables 12 are stored so as to be available, not only to the descrambler 1, but also to the decoder 3. In this embodiment, it is therefore the same first look-up table 12 that is used in the bit-replacement operation 134 and the bit-restoration operation 164. In the bit-restoration operation 164, the value of the block $P_x^*$ is sought in the second column of the first look-up table 12, for example, by consulting, successively in a predetermined order, the strings 16 present in the second column of this table.

In another embodiment, after the implementation of the first initialization-step 110, the second initialization-step 112 is implemented a number $t_2$ of times, where $t_2$ is strictly positive and strictly less than $t_1$, such that, only $t_2$ second look-up tables 18 are stored. For example, for the values of the index i in the closed interval $[0, t_2-1]$, a table L[i] is constructed for each table T[i] constructed. Conversely, for the values of the index i lying in the closed interval $[t_2, t_1-1]$, only the table T[i] is constructed. In this latter case, the table T[i] is stored so as to be available, not only to the descrambler 1, but also to the decoder 3. Subsequently, if, in the table-pairing operation 162, the value of the index i lies in the closed interval $[0, t_2-1]$, then, in the bit-restoration operation 164, the value of the block $P_x^*$ is sought in the table L[i] corresponding to the table T[i]. In contrast, if, in the table-pairing operation 162, the value of the index i lies in the closed interval $[t_2, t_1-1]$, in the bit-restoration operation 164, the value of the block $P_x^*$ is sought in the second column of the table T[i].

In another embodiment, in the third initialization-step 114, in order to make the numbers S, k, u generated available to the descrambler 1 and to the decoder 3, the terminal stores them in a memory specific to the descrambler 1 and in a memory specific to the decoder 3.

In a simplified embodiment, $t_1$ is equal to one, in which case a single first look-up table 12 is used to create the modified fragment or all of the modified fragments.

The table-selecting operation 132 and the table-pairing operation 162 can be performed differently. For example, the use of the number u can be omitted. In this case, the index i of the first look-up table 12 or the second look-up table 18 selected is determined using the formula:

$i = S[(x-1) \text{ modulo } k] \text{ modulo } t_{=1}.$

It is also possible to determine the index i without using the initialization number S. For example, in this latter case, it is possible to use the formula:

$i = x \text{ modulo } t_1.$

In this embodiment, there is no need to construct the numbers S, u and k in the third initialization-step 114.

Yet another embodiment omits the first, second, and third initialization-steps 110, 112, and 114. Thus, no first or second look-up table 12, 18 is stored before the start of the replacement step 130. In this case, in the table-selection operation 132, a first look-up table 12 is constructed in line with the executions of the table-selection operation 132. For example, it is assumed here that M and N are known constants and that the first look-up table 12 is initially empty.

Next, if the value of the next block $P_x$ of the unscrambled fragment does not correspond to any string 14 already contained in the first look-up table 12, a string 16 is generated then stored in the first look-up table 12 in association with the original bits of the block $P_x$. For example, the string 16 is generated:
  a) By randomly or pseudo-randomly drawing a string 16 from the set of the 2N possible strings 16, then
  b) If the string 16 thus randomly drawn has not already been associated with another string 14, then it is associated in the first look-up table 12 with this string 14 and, otherwise, the operations a) and b) are reiterated.

In this way, a table, which is a dynamic table, is constructed step-by-step. This dynamic table differs from the first look-up table 12 only in that it may not contain all the possible strings 14. The dynamic table contains only the strings 14 necessary to process the unscrambled fragment. Next, in the table-pairing operation 162, a corresponding dynamic table is constructed, for example, as described for the second initialization-step 112.

In another embodiment, the use of the first and second look-up tables 12, 18 is replaced by use of an encryption function F and of a decryption function $F^{-1}$. More specifically, the function F executes different arithmetic and logic operations on the bits of a string 14 to generate the string 16 which is associated with it. The function $F^{-1}$ is the inverse of the function F. It therefore returns the value of the string 14 associated with a string 16. The functions F and $F^{-1}$ are therefore used in place of the first and second look-up tables 12, 18 in the execution, respectively, of the bit-replacement operation 134 and the bit-restoration operation 164.

In another embodiment, all of the original bits are not replaced by substituted bits in the replacement step 130. To this end, for example, in the bit-replacement operation 134, only a predetermined fraction of the blocks $P_x$ form the object of the replacement described above. For the other blocks $P_x$, the original bits are directly concatenated with the result of the processing of the preceding blocks. The predetermined fraction of the blocks replaced can be modified for each unscrambled fragment processed. For example, for the even unscrambled fragments, the method applies the table-selection operation 132 and the bit-replacement operation 134 to only one block $P_x$ out of two and, for the odd fragments, only to one block $P_x$ out of three. In the fragment-reconstruction step 160, the decoder 3 performs the reciprocal replacements of those performed in the replacement step 130. Thus, if all of the original bits are not replaced with substituted bits in the replacement step 130, in the fragment-reconstruction step 160, only a fraction of the blocks is identified as having blocks of substituted bits $P_x^*$. Only these identified blocks $P_x^*$ form the object of the replacement described above, the other bits being directly concatenated with the result of the processing of the preceding blocks.

In another embodiment, in the bit-replacement operation 134, the descrambler 1 forms blocks $P_x$ of length greater than M, and replaces only one string of M original bits of this block $P_x$ with a string 16. This string of M original bits is situated in the same predetermined position in each block $P_x$. For example, this string of M original bits is situated at the start of the block $P_x$. That amounts to inserting, into the modified fragment, a string of original bits between each string 16. In the bit-restoration operation 164, the decoder 3 forms blocks $P_x^*$ of predetermined length greater than N, and it replaces only the predetermined part of these bits corresponding to the string 16. The remaining bits of the block $P_x^*$ are unchanged. The length of the block $P_x$, and the position in the block $P_x$ of the string of M original bits replaced, can each be constant or variable.

In another embodiment, also, in the bit-replacement operation 134, when there remain fewer than M original bits of the unscrambled fragment to be replaced, these last original bits are not replaced, but directly concatenated with the preceding strings 16 read. In this case, in the bit-restoration operation 164, the last block $P_x^*$ has fewer than M bits, and these bits are not replaced, but directly concatenated with the preceding strings 14 read.

In another embodiment, in the fragment-storage step 140, the modified fragment is stored in the shared memory 5, jointly with the useful length, in bits, of the unscrambled fragment or of its last block $P_x$. Next, the decoder 3 then extracts from the shared memory 5, in the fragment-extraction step 150, the modified fragment and this useful length. Then, in the bit-restoration operation 164, the decoder 3 replaces the last block $P_x^*$ like the preceding ones, but concatenates, with the preceding strings 14 read, only the first useful bits of the string 14 thus read. The number of first useful bits is determined from the useful length extracted in the fragment-extraction step 150.

Having described the invention, and a preferred embodiment thereof, what is claimed as new and secured by Letters Patent is:

1. A method for accessing protected multimedia content by using a terminal that comprises a descrambler, a decoder, and a shared memory, said method comprising causing said descrambler to execute a descrambling phase and causing said decoder to execute a decoding phase, wherein said descrambling phase comprises a fragment-receiving step, a fragment-decrypting step, a bit-replacement step, and a fragment-storage step, wherein said decoding phase comprises a fragment-extraction step, a fragment-reconstruction step, a fragment-decoding step and a fragment-transmission step, wherein said fragment-receiving step comprises receiving an encrypted fragment of said multimedia content and receiving a key for decrypting said encrypted fragment, wherein said fragment-decrypting step comprises using said decryption key to decrypt said received fragment, thereby obtaining an unscrambled fragment, wherein said bit-replacement step comprises replacing original bits of said unscrambled fragment with different substituted bits to obtain a modified fragment, wherein said fragment-storage step comprises storing said modified fragment in said shared memory, wherein said fragment-extraction step comprises extracting said modified fragment from said shared memory, wherein said fragment-reconstruction step comprises replacing substituted bits of said extracted modified fragment with said original bits to reconstruct said unscrambled fragment, wherein said fragment-decoding step comprises decoding said reconstructed unscrambled fragment to obtain a decoded fragment, and wherein said fragment-transmission step comprises transmitting said decoded fragment to a multimedia appliance capable of playing this decoded fragment of said multimedia content, wherein said bit-replacement step comprises replacing a string of M consecutive original bits of said unscrambled fragment with a string of N consecutive substituted bits, where N is strictly greater than M and said string of N consecutive substituted bits is different for each different string of M consecutive original bits, and wherein said fragment-reconstruction step comprises replacing said string of N consecutive substituted bits with said string of M consecutive original bits, wherein said method further comprises, before execution of said fragment-decrypting step, said bit-replacement step, said fragment-storage step, said fragment-extraction step, and said fragment-reconstruction step, causing said terminal to store a first table comprising a line for each possible string of M original bits, each line associated, with a possible string of M original bits, a string of N substituted bits different from those associated with said other possible strings of M original bits, said lines of said first table being ranked in order of values of said possible strings of M original bits to constitute an index of said first table, and wherein said bit-replacement step comprises reading, in said first table, said string of N substituted bits associated with said string of M original bits of said unscrambled fragment, and replacing said string of M original bits of said unscrambled fragment with said selected string of N substituted bits to obtain said modified fragment, and causing said terminal to store a second table comprising a line for each string of N substituted bits, said line associating, with said string of N substituted bits, said string of M original bits with which said string of N substituted bits was associated by said first table, wherein said first table corresponds to said second table, wherein said second table makes it possible to reconstruct said unscrambled fragment from said modified fragment obtained using said first table, and wherein said fragment-reconstruction step comprises reading, in said second table corresponding to said first table, said string of M original bits associated with said string of N substituted bits of said modified fragment, and replacing said string of N substituted bits of said modified fragment with said read string of M original bits to reconstruct said unscrambled fragment, wherein in said set of said values of M bits of given indices, two-by-two distinct, from each string of N substituted bits is equal to said set of said possible values of said strings of M bits, and wherein said lines of said second table are ranked only by order of said values of said M bits of given indices of each string of N substituted bits, such that said M bits of given indices define an index of said second table.

2. A method for accessing protected multimedia content by using a terminal that comprises a descrambler, a decoder, and a shared memory, said method comprising causing said descrambler to execute a descrambling phase and causing said decoder to execute a decoding phase, wherein said descrambling phase comprises a fragment-receiving step, a fragment-decrypting step, a bit-replacement step, and a fragment-storage step, wherein said decoding phase comprises a fragment-extraction step, a fragment-reconstruction step, a fragment-decoding step and a fragment-transmission step, wherein said fragment-receiving step comprises receiving an encrypted fragment of said multimedia content and receiving a key for decrypting said encrypted fragment, wherein said fragment-decrypting step comprises using said decryption key to decrypt said received fragment, thereby obtaining an unscrambled fragment, wherein said bit-replacement step comprises replacing original bits of said unscrambled fragment with different substituted bits to obtain a modified fragment, wherein said fragment-storage step comprises storing said modified fragment in said shared memory, wherein said fragment-extraction step comprises extracting said modified fragment from said shared memory, wherein said fragment-reconstruction step comprises replacing substituted bits of said extracted modified fragment with said original bits to reconstruct said unscrambled fragment, wherein said fragment-decoding step comprises decoding said reconstructed unscrambled fragment to obtain a decoded fragment, and wherein said fragment-transmission step comprises transmitting said decoded fragment to a multimedia appliance capable of playing this decoded fragment of said multimedia content, wherein said bit-replacement step comprises replacing a string of M consecutive original bits of said unscrambled fragment with a string of N consecutive substituted bits, where N is strictly greater than M and said string of N consecutive substituted bits is different for each different string of M consecutive original bits, and wherein said fragment-reconstruction step comprises replacing said string of N consecutive substituted bits with said string of M consecutive original bits, before execution of said fragment-decrypting step, before execution of said bit-replacement step, before execution of said fragment-storage step, before execution of said fragment-extraction step, and before execution of said fragment-reconstruction step, causing said terminal to store a first table comprising a line for each possible string of M original bits, each line associated, with a possible string of M original bits, a string of N substituted bits different from those associated with said other possible strings of M original bits, said lines of said first table being ranked in order of values of said possible strings of M original bits to constitute an index of said first table, and wherein said bit-replacement step comprises reading, in said first table, said string of N substituted bits associated with said string of M original bits of said unscrambled fragment, and replacing said string of M original bits of said unscrambled fragment with said selected string of N substituted bits to obtain said modified fragment, before execution of said fragment-decrypting step, before execution of said bit-replacement step, before execution of said fragment-storage step, before execution of said fragment-extraction step, and before execution of said fragment-reconstruction step, causing said terminal to store several different first look-up tables, wherein said bit-replacement step comprises selecting one of said first look-up tables, thereby designating a selected first look-up table, and using said selected first look-up table, and wherein said fragment-reconstruction step comprises reconstructing said selected first look-up table, further comprising, before execution of said fragment-decrypting step, before execution of said bit-replacement step, before execution of said fragment-storage step, before execution of said fragment-extraction step, and before execution of said fragment-reconstruction step, causing said terminal to draw a random or pseudo-random number, thereby defining a drawn number, providing said drawn number to said descrambler and providing said drawn number to said decoder, wherein said bit-replacement step comprises selecting said first look-up table as a function of said drawn number, and wherein said fragment-reconstruction step comprises determining reconstructing, as a function of said drawn number, said first look-up table selected in said bit-replacement step.

3. The method as claimed in claim 2, in which, at least two of said different first look-up tables stored differ from one another at least by said length M of said strings of original bits or by said length N of said strings of substituted bits.

4. The method of claim 2, further comprising selecting the number of different stored look-up tables to be a positive power of two.

5. The method of claim 2, further comprising selecting the number of bytes of said drawn number to be a positive power of two.

6. A manufacture comprising a tangible and non-transitory information storage medium having encoded thereon instructions for implementing a method for accessing protected multimedia content by using a terminal that comprises a descrambler, a decoder, and a shared memory when said instructions are executed by an electronic computer, wherein said method is selected from the group consisting of a first set of steps and a second step of steps, wherein said first set of steps comprises causing said descrambler to execute a descrambling phase and causing said decoder to execute a decoding phase, wherein said descrambling phase comprises a fragment-receiving step, a fragment-decrypting step, a bit-replacement step, and a fragment-storage step, wherein said decoding phase comprises a fragment-extraction step, a fragment-reconstruction step, a fragment-decoding step and a fragment-transmission step, wherein said fragment-receiving step comprises receiving an encrypted fragment of said multimedia content and receiving a key for decrypting said encrypted fragment, wherein said fragment-decrypting step comprises using said decryption key to decrypt said received fragment, thereby obtaining an unscrambled fragment, wherein said bit-replacement step comprises replacing original bits of said unscrambled fragment with different substituted bits to obtain a modified fragment, wherein said fragment-storage step comprises storing said modified fragment in said shared memory, wherein said fragment-extraction step comprises extracting said modified fragment from said shared memory, wherein said fragment-reconstruction step comprises replacing substituted bits of said extracted modified fragment with said original bits to reconstruct said unscrambled fragment, wherein said fragment-decoding step comprises decoding said reconstructed unscrambled fragment to obtain a decoded fragment, and wherein said fragment-transmission step comprises transmitting said decoded fragment to a multimedia appliance capable of playing this decoded fragment of said multimedia content, wherein said bit-replacement step comprises replacing a string of M consecutive original bits of said unscrambled fragment with a string of N consecutive substituted bits, where N is strictly greater than M and said string of N consecutive substituted bits is different for each different string of M consecutive original bits, and wherein said fragment-reconstruction step comprises replacing said string of N consecutive substituted bits with said string of M consecutive original bits, wherein said method further comprises, before execution of said fragment-decrypting step, said bit-replacement step, said fragment-storage step, said fragment-extraction step, and said fragment-reconstruction step, causing said terminal to store a first table comprising a line for each possible string of M original bits, each line associated, with a possible string of M original bits, a string of N substituted bits different from those associated with said other possible strings of M original bits, said lines of said first table being ranked in order of values of said possible strings of M original bits to constitute an index of said first table, and wherein said bit-replacement step comprises reading, in said first table, said string of N substituted bits associated with said string of M original bits of said unscrambled fragment, and replacing said string of M original bits of said unscrambled fragment with said selected string of N substituted bits to obtain said modified fragment, and causing said terminal to store a second table comprising a line for each string of N substituted bits, said line associating, with said string of N substituted bits, said string of M original bits with which said string of N substituted bits was associated by said first table, wherein said first table corresponds to said second table, wherein said second table makes it possible to reconstruct said unscrambled fragment from said modified fragment obtained using said first table, and wherein said fragment-reconstruction step comprises reading, in said second table corresponding to said first table, said string of M original bits associated with said string of N substituted bits of said modified fragment, and replacing said string of N substituted bits of said modified fragment with said read string of M original bits to reconstruct said unscrambled fragment, wherein in said set of said values of M bits of given indices, two-by-two distinct, from each string of N substituted bits is equal to said set of said possible values of said strings of M bits, and wherein said lines of said second table are ranked only by order of said values of said M bits of given indices of each string of N substituted bits, such that said M bits of given indices define an index of said second table, and wherein said second set of steps comprises causing said descrambler to execute a descrambling phase and causing said decoder to execute a decoding phase, wherein said descrambling phase comprises a fragment-receiving step, a fragment-decrypting step, a bit-replacement step, and a fragment-storage step, wherein said decoding phase comprises a fragment-extraction step, a fragment-reconstruction step, a fragment-decoding step and a fragment-transmission step, wherein said fragment-receiving step comprises receiving an encrypted fragment of said multimedia content and receiving a key for decrypting said encrypted fragment, wherein said fragment-decrypting step comprises using said decryption key to decrypt said received fragment, thereby obtaining an unscrambled fragment, wherein said bit-replacement step comprises replacing original bits of said unscrambled fragment with different substituted bits to obtain a modified fragment, wherein said fragment-storage step comprises storing said modified fragment in said shared memory, wherein said fragment-extraction step comprises extracting said modified fragment from said shared memory, wherein said fragment-reconstruction step comprises replacing substituted bits of said extracted modified fragment with said original bits to reconstruct said unscrambled fragment, wherein said fragment-decoding step comprises decoding said reconstructed unscrambled fragment to obtain a decoded fragment, and wherein said fragment-transmission step comprises transmitting said decoded fragment to a multimedia appliance capable of playing this decoded fragment of said multimedia content, wherein said bit-replacement step comprises replacing a string of M consecutive original bits of said unscrambled fragment with a string of N consecutive substituted bits, where N is strictly greater than M and said string of N consecutive substituted bits is different for each different string of M consecutive original bits, and wherein said fragment-reconstruction step comprises replacing said string of N consecutive substituted bits with said string of M consecutive original bits, before execution of said fragment-decrypting step, before execution of said bit-replacement step, before execution of said fragment-storage step, before execution of said fragment-extraction step, and before execution of said fragment-reconstruction step, causing said terminal to store a first table comprising a line for each possible string of M original bits, each line associated, with a possible string of M original bits, a string of N substituted bits different from those associated with said other possible strings of M original bits, said lines of said first table being ranked in order of values of said possible strings of M original bits to constitute an index of said first table, and wherein said bit-replacement step comprises reading, in said first table, said string of N substituted bits associated with said string of M original bits of said unscrambled fragment, and replacing said string of M original bits of said unscrambled fragment with said selected string of N substituted bits to obtain said modified fragment, before execution of said fragment-decrypting step, before execution of said bit-replacement step, before execution of said fragment-storage step, before execution of said fragment-extraction step, and before execution of said fragment-reconstruction step, causing said terminal to store several different first look-up tables, wherein said bit-replacement step comprises selecting one of said first look-up tables, thereby designating a selected first look-up table, and using said selected first look-up table, and wherein said fragment-reconstruction step comprises reconstructing said selected first look-up table, further comprising, before execution of said fragment-decrypting step, before execution of said bit-replacement step, before execution of said fragment-storage step, before execution of said fragment-extraction step, and before execution of said fragment-reconstruction step, causing said terminal to draw a random or pseudo-random number, thereby defining a drawn number, providing said drawn number to said descrambler and providing said drawn number to said decoder, wherein said bit-replacement step comprises selecting said first look-up table as a function of said drawn number, and wherein said fragment-reconstruction step comprises determining, as a function of said drawn number, said first look-up table selected in said bit-replacement step.

7. An apparatus comprising a terminal, wherein said terminal comprises a descrambler, a decoder, a shared memory, and an electronic computer programmed to execute said bit-replacement step and said fragment-reconstruction step using a method for accessing protected multimedia content by using a terminal that comprises a descrambler, a decoder, and a shared memory, wherein said method is selected from the group consisting of a first set of steps and a second step of steps, wherein said first set of steps comprises causing said descrambler to execute a descrambling phase and causing said decoder to execute a decoding phase, wherein said descrambling phase comprises a fragment-receiving step, a fragment-decrypting step, a bit-replacement step, and a fragment-storage step, wherein said decoding phase comprises a fragment-extraction step, a fragment-reconstruction step, a fragment-decoding step and a fragment-transmission step, wherein said fragment-receiving step comprises receiving an encrypted fragment of said multimedia content and receiving a key for decrypting said encrypted fragment, wherein said fragment-decrypting step comprises using said decryption key to decrypt said received fragment, thereby obtaining an unscrambled fragment, wherein said bit-replacement step comprises replacing original bits of said unscrambled fragment with different substituted bits to obtain a modified fragment, wherein said fragment-storage step comprises storing said modified fragment in said shared memory, wherein said fragment-extraction step comprises extracting said modified fragment from said shared memory, wherein said fragment-reconstruction step comprises replacing substituted bits of said extracted modified fragment with said original bits to reconstruct said unscrambled fragment, wherein said fragment-decoding step comprises decoding said reconstructed unscrambled fragment to obtain a decoded fragment, and wherein said fragment-transmission step comprises transmitting said decoded fragment to a multimedia appliance capable of playing this decoded fragment of said multimedia content, wherein said bit-replacement step comprises replacing a string of M consecutive original bits of said unscrambled fragment with a string of N consecutive substituted bits, where N is strictly greater than M and said string of N consecutive substituted bits is different for each different string of M consecutive original bits, and wherein said fragment-reconstruction step comprises replacing said string of N consecutive substituted bits with said string of M consecutive original bits, wherein said method further comprises, before execution of said fragment-decrypting step, said bit-replacement step, said fragment-storage step, said fragment-extraction step, and said fragment-reconstruction step, causing said terminal to store a first table comprising a line for each possible string of M original bits, each line associated, with a possible string of M original bits, a string of N substituted bits different from those associated with said other possible strings of M original bits, said lines of said first table being ranked in order of values of said possible strings of M original bits to constitute an index of said first table, and wherein said bit-replacement step comprises reading, in said first table, said string of N substituted bits associated with said string of M original bits of said unscrambled fragment, and replacing said string of M original bits of said unscrambled fragment with said selected string of N substituted bits to obtain said modified fragment, and causing said terminal to store a second table comprising a line for each string of N substituted bits, said line associating, with said string of N substituted bits, said string of M original bits with which said string of N substituted bits was associated by said first table, wherein said first table corresponds to said second table, wherein said second table makes it possible to reconstruct said unscrambled fragment from said modified fragment obtained using said first table, and wherein said fragment-reconstruction step comprises reading, in said second table corresponding to said first table, said string of M original bits associated with said string of N substituted bits of said modified fragment, and replacing said string of N substituted bits of said modified fragment with said read string of M original bits to reconstruct said unscrambled fragment, wherein in said set of said values of M bits of given indices, two-by-two distinct, from each string of N substituted bits is equal to said set of said possible values of said strings of M bits, and wherein said lines of said second table are ranked only by order of said values of said M bits of given indices of each string of N substituted bits, such that said M bits of given indices define an index of said second table, and wherein said second set of steps comprises causing said descrambler to execute a descrambling phase and causing said decoder to execute a decoding phase, wherein said descrambling phase comprises a fragment-receiving step, a fragment-decrypting step, a bit-replacement step, and a fragment-storage step, wherein said decoding phase comprises a fragment-extraction step, a fragment-reconstruction step, a fragment-decoding step and a fragment-transmission step, wherein said fragment-receiving step comprises receiving an encrypted fragment of said multimedia content and receiving a key for decrypting said encrypted fragment, wherein said fragment-decrypting step comprises using said decryption key to decrypt said received fragment, thereby obtaining an unscrambled fragment, wherein said bit-replacement step comprises replacing original bits of said unscrambled fragment with different substituted bits to obtain a modified fragment, wherein said fragment-storage step comprises storing said modified fragment in said shared memory, wherein said fragment-extraction step comprises extracting said modified fragment from said shared memory, wherein said fragment-reconstruction step comprises replacing substituted bits of said extracted modified fragment with said original bits to reconstruct said unscrambled fragment, wherein said fragment-decoding step comprises decoding said reconstructed unscrambled fragment to obtain a decoded fragment, and wherein said fragment-transmission step comprises transmitting said decoded fragment to a multimedia appliance capable of playing this decoded fragment of said multimedia content, wherein said bit-replacement step comprises replacing a string of M consecutive original bits of said unscrambled fragment with a string of N consecutive substituted bits, where N is strictly greater than M and said string of N consecutive substituted bits is different for each different string of M consecutive original bits, and wherein said fragment-reconstruction step comprises replacing said string of N consecutive substituted bits with said string of M consecutive original bits, before execution of said fragment-decrypting step, before execution of said bit-replacement step, before execution of said fragment-storage step, before execution of said fragment-extraction step, and before execution of said fragment-reconstruction step, causing said terminal to store a first table comprising a line for each possible string of M original bits, each line associated, with a possible string of M original bits, a string of N substituted bits different from those associated with said other possible strings of M original bits, said lines of said first table being ranked in order of values of said possible strings of M original bits to constitute an index of said first table, and wherein said bit-replacement step comprises reading, in said first table, said string of N substituted bits associated with said string of M original bits of said unscrambled fragment, and replacing said string of M original bits of said unscrambled fragment with said selected string of N substituted bits to obtain said modified fragment, before execution of said fragment-decrypting step, before execution of said bit-replacement step, before execution of said fragment-storage step, before execution of said fragment-extraction step, and before execution of said fragment-reconstruction step, causing said terminal to store several different first look-up tables, wherein said bit-replacement step comprises selecting one of said first look-up tables, thereby designating a selected first look-up table, and using said selected first look-up table, and wherein said fragment-reconstruction step comprises reconstructing said selected first look-up table, further comprising, before execution of said fragment-decrypting step, before execution of said bit-replacement step, before execution of said fragment-storage step, before execution of said fragment-extraction step, and before execution of said fragment-reconstruction step, causing said terminal to draw a random or pseudo-random number, thereby defining a drawn number, providing said drawn number to said descrambler and providing said drawn number to said decoder, wherein said bit-replacement step comprises selecting said first look-up table as a function of said drawn number, and wherein said fragment-reconstruction step comprises determining, as a function of said drawn number, said first look-up table selected in said bit-replacement step.

* * * * *